US007050818B2

(12) United States Patent
Tendler

(10) Patent No.: US 7,050,818 B2
(45) Date of Patent: *May 23, 2006

(54) LOCATION BASED SERVICE REQUEST SYSTEM

(75) Inventor: Robert K. Tendler, Chestnut Hill, MA (US)

(73) Assignee: Tendler Cellular, Inc., Boston, MA (US)

( * ) Notice: Subject to any disclaimer, the term of this patent is extended or adjusted under 35 U.S.C. 154(b) by 33 days.

This patent is subject to a terminal disclaimer.

(21) Appl. No.: 10/347,991

(22) Filed: Jan. 21, 2003

(65) Prior Publication Data

US 2003/0109244 A1 Jun. 12, 2003

Related U.S. Application Data

(63) Continuation of application No. 08/608,482, filed on Feb. 28, 1996, now Pat. No. 6,519,463.

(51) Int. Cl.
*H04Q 7/20* (2006.01)

(52) U.S. Cl. .............................. 455/456.2; 455/404.2; 455/408

(58) Field of Classification Search ............. 455/404.2, 455/404.1, 406, 407, 408, 414.1, 445, 456.1, 455/456.2, 456.3, 456.5, 456.6, 550.1; 342/357.1, 342/357.01, 357.06, 357.07, 357.08, 357.09, 342/357.12, 357.13, 357.17, 450, 457; 340/988, 340/989, 991, 993, 825.49; 701/207, 215
See application file for complete search history.

(56) References Cited

U.S. PATENT DOCUMENTS

| 2,070,112 A | 2/1937 | Bowles ..................... 455/347 |
| 2,348,393 A | 5/1944 | Krieger ..................... 200/334 |
| 3,142,227 A | 7/1964 | Stringer ..................... 89/136 |
| 3,199,108 A | 8/1965 | Munk ......................... 343/718 |
| 3,266,042 A | 8/1966 | Mahoney et al. ........... 343/718 |
| 3,317,698 A | 5/1967 | Mansfield ................... 200/333 |
| 3,581,208 A | 5/1971 | Buehrle, Jr. et al. ........ 455/521 |

(Continued)

FOREIGN PATENT DOCUMENTS

EP 0559074 9/1993

(Continued)

*Primary Examiner*—Charles N. Appiah
(74) *Attorney, Agent, or Firm*—Robert K. Tendler

(57) ABSTRACT

A wireless phone based system to accommodate users of wireless phones for providing information as to the location of certain services such as gasoline stations, movie theatres, drug stores, etc., includes the utilization of a GPS receiver and a wireless phone, with the wireless phone adapted to call a predetermined number requesting the desired service and providing the location of the cellular phone. In one embodiment, the GPS receiver is co-located with the wireless phone in a car, with the wireless phone being carried in a handsfree cradle having a number of service-request buttons, such that depression of a service-request button activates the wireless phone through its bus structure to call a predetermined number and provide the identity of the caller along with the caller's location. In a further embodiment, a single button, located on the phone or on the handsfree cradle, is utilized to cause the wireless phone to dial a concierge service, in which the concierge service has operators and a database, such that the operator can either direct the caller to whatever service the caller desires or take care of the request, with the operator having been apprised of the location of the wireless phone. This allows the operator to key in the latitude and longitude of the wireless phone and access the database of services both as to the type of service and as to the location of the closest service provider.

18 Claims, 3 Drawing Sheets

U.S. PATENT DOCUMENTS

| | | | | |
|---|---|---|---|---|
| 3,666,901 | A | 5/1972 | Weinhart | 200/43.18 |
| 3,723,876 | A | 3/1973 | Seaborn, Jr. | 455/18 |
| 3,824,469 | A | 7/1974 | Ristenbatt | 342/42 |
| 3,845,389 | A | 10/1974 | Phillips et al. | 455/90.3 |
| 3,889,190 | A | 6/1975 | Palmer | 455/90.3 |
| 3,977,003 | A | 8/1976 | Kershaw | 343/702 |
| 4,032,844 | A | 6/1977 | Imazeki | 455/77 |
| 4,057,794 | A | 11/1977 | Grossfield | 340/7.5 |
| 4,176,254 | A | 11/1979 | Tuttle | 379/45 |
| 4,198,601 | A | 4/1980 | Ono et al. | 455/73 |
| 4,232,390 | A | 11/1980 | McEvilly, Jr. | 455/90.2 |
| 4,232,391 | A | 11/1980 | Zanutti | 455/96 |
| 4,357,711 | A | 11/1982 | Drefko et al. | 455/90.3 |
| 4,394,552 | A | 7/1983 | Schlosser | 200/61.62 |
| 4,435,711 | A | 3/1984 | Ho et al. | 342/389 |
| 4,455,551 | A | 6/1984 | Lemelson | 340/539.17 |
| 4,468,656 | A | 8/1984 | Clifford et al. | 340/539.11 |
| 4,494,119 | A | 1/1985 | Wimbush | 342/457 |
| 4,517,410 | A | 5/1985 | Williams et al. | 379/73 |
| 4,520,576 | A | 6/1985 | Vander Molen | 34/534 |
| 4,524,461 | A | 6/1985 | Kostanty et al. | 455/79 |
| 4,534,056 | A | 8/1985 | Feilchenfeld et al. | 704/272 |
| 4,547,778 | A | 10/1985 | Hinkle et al. | 342/456 |
| 4,560,978 | A | 12/1985 | Lemelson | 340/539.22 |
| 4,589,132 | A | 5/1986 | Botbol et al. | 704/274 |
| 4,606,073 | A | 8/1986 | Moore | 415/90.1 |
| 4,607,395 | A | 8/1986 | Sundahl | 455/351 |
| 4,622,557 | A | 11/1986 | Westerfield | 342/357.09 |
| 4,653,100 | A | 3/1987 | Barnett et al. | 704/268 |
| 4,680,787 | A | 7/1987 | Marry | 455/557 |
| 4,700,374 | A | 10/1987 | Bini | 455/456.2 |
| 4,724,538 | A | 2/1988 | Farrell | 455/404.1 |
| 4,748,685 | A | 5/1988 | Rozanski, Jr. | 455/218 |
| 4,792,968 | A | 12/1988 | Katz | 379/92.03 |
| 4,831,438 | A | 5/1989 | Bellman, Jr. et al. | 348/148 |
| 4,833,477 | A | 5/1989 | Tendler | 342/389 |
| 4,833,726 | A | 5/1989 | Shinoda et al. | 455/90.3 |
| 4,845,739 | A | 7/1989 | Katz | 379/92.03 |
| 4,903,262 | A | 2/1990 | Dissosway et al. | 370/327 |
| 4,905,289 | A | 2/1990 | Micic et al. | 704/269 |
| 4,924,491 | A | 5/1990 | Compton et al. | 379/37 |
| 4,928,107 | A | 5/1990 | Kuroda et al. | 342/357.15 |
| 4,931,950 | A | 6/1990 | Isle et al. | 706/11 |
| 4,974,250 | A | 11/1990 | Tomiyori | 455/557 |
| 5,014,298 | A | 5/1991 | Katz | 379/93.12 |
| 5,019,828 | A | 5/1991 | Schoolman | 342/457 |
| 5,027,352 | A | 6/1991 | Goode | 370/345 |
| 5,027,409 | A | 6/1991 | Sakamoto | 704/201 |
| 5,043,736 | A | 8/1991 | Darnell et al. | 342/357.1 |
| 5,047,953 | A | 9/1991 | Smallwood et al. | 704/271 |
| 5,073,929 | A | 12/1991 | Katz | 379/93.12 |
| 5,074,317 | A | 12/1991 | Bondell et al. | 128/886 |
| 5,081,667 | A | 1/1992 | Drori et al. | 488/404.1 |
| 5,086,391 | A | 2/1992 | Chambers | 340/573.1 |
| 5,091,950 | A | 2/1992 | Ahmed | 704/277 |
| 5,095,509 | A | 3/1992 | Volk | 704/270 |
| 5,109,399 | A | 4/1992 | Thompson | 379/201.08 |
| 5,113,481 | A | 5/1992 | Smallwood et al. | 704/271 |
| 5,119,505 | A | 6/1992 | Tisseront et al. | 455/575.2 |
| 5,140,632 | A | 8/1992 | Anten | 379/447 |
| 5,142,700 | A | 8/1992 | Reed | 455/344 |
| 5,144,323 | A | 9/1992 | Yonkers | 342/386 |
| 5,148,002 | A | 9/1992 | Kuo et al. | 219/211 |
| 5,148,452 | A | 9/1992 | Kennedy et al. | 375/343 |
| 5,193,215 | A | 3/1993 | Olmer | 455/521 |
| 5,198,831 | A | 3/1993 | Burrell et al. | 343/895 |
| 5,224,153 | A | 6/1993 | Katz | 379/93.12 |
| 5,225,843 | A | 7/1993 | Thompson | 342/367 |
| 5,235,633 | A | 8/1993 | Dennison et al. | 455/456.3 |
| 5,249,223 | A | 9/1993 | Vanacore | 379/266.06 |
| 5,266,958 | A | 11/1993 | Durboraw, III | 342/357.08 |
| 5,309,546 | A | 5/1994 | Baker et al. | 704/271 |
| 5,311,197 | A | 5/1994 | Sorden et al. | 342/457 |
| 5,334,974 | A | 8/1994 | Simms et al. | 340/990 |
| 5,343,493 | A * | 8/1994 | Karimullah | 375/130 |
| 5,345,244 | A | 9/1994 | Gildea et al. | 342/357.12 |
| 5,347,286 | A | 9/1994 | Babitch | 342/359 |
| 5,355,140 | A | 10/1994 | Slavin et al. | 342/386 |
| 5,359,645 | A | 10/1994 | Katz | 379/93.02 |
| 5,365,450 | A | 11/1994 | Schuchman et al. | 485/456.3 |
| 5,377,256 | A | 12/1994 | Franklin et al. | 455/404.1 |
| 5,388,147 | A | 2/1995 | Grimes | 455/404.2 |
| 5,403,197 | A | 4/1995 | Ernst et al. | 439/165 |
| 5,404,577 | A | 4/1995 | Zuckerman et al. | 455/66.1 |
| 5,410,749 | A | 4/1995 | Siwiak et al. | 455/280 |
| 5,414,432 | A | 5/1995 | Penny, Jr. et al. | 342/357.16 |
| 5,414,756 | A | 5/1995 | Levine | 379/88.23 |
| 5,432,841 | A | 7/1995 | Rimer | 455/457 |
| 5,434,904 | A | 7/1995 | Tsuzuki et al. | 455/456.3 |
| 5,479,482 | A | 12/1995 | Grimes | 455/556.1 |
| 5,495,416 | A | 2/1996 | Buchwitz et al. | 701/213 |
| 5,515,043 | A | 5/1996 | Berard et al. | 340/988 |
| 5,519,403 | A | 5/1996 | Bickley et al. | 342/352 |
| 5,546,445 | A | 8/1996 | Dennison et al. | 455/408 |
| 5,548,801 | A | 8/1996 | Araki et al. | 455/13.1 |
| 5,552,993 | A | 9/1996 | Buchwitz et al. | 701/213 |
| 5,553,125 | A | 9/1996 | Martensson | 455/412.2 |
| 5,555,286 | A | 9/1996 | Tendler | 455/404.2 |
| 5,557,254 | A | 9/1996 | Johnson et al. | 340/426.19 |
| 5,561,704 | A | 10/1996 | Salimando | 455/456.5 |
| 5,579,535 | A * | 11/1996 | Orlen et al. | 340/995.24 |
| 5,587,715 | A | 12/1996 | Lewis | 342/357.03 |
| 5,594,453 | A | 1/1997 | Rodal et al. | 342/357.15 |
| 5,598,460 | A | 1/1997 | Tendler | 455/404.2 |
| 5,604,790 | A | 2/1997 | Grimes | 379/88.04 |
| 5,604,794 | A | 2/1997 | Vogel et al. | 379/93.14 |
| 5,630,206 | A | 5/1997 | Urban et al. | 455/456.1 |
| 5,649,059 | A | 7/1997 | Tendler et al. | 704/275 |
| 5,650,770 | A | 7/1997 | Schlager et al. | 340/573.1 |
| 5,652,570 | A | 7/1997 | Lepkofker | 340/573.4 |
| 5,673,305 | A | 9/1997 | Ross | 455/517 |
| 5,675,371 | A | 10/1997 | Barringer | 725/148 |
| 5,736,962 | A | 4/1998 | Tendler | 342/357.1 |
| 5,740,538 | A * | 4/1998 | Joyce et al. | 455/456.2 |
| 5,748,147 | A | 5/1998 | Bickley et al. | 342/457 |
| 5,768,382 | A | 6/1998 | Schneier et al. | 380/251 |
| 5,778,315 | A * | 7/1998 | Proietti | 455/419 |
| 5,786,789 | A | 7/1998 | Janky | 342/357.1 |
| 5,794,151 | A | 8/1998 | McDonald et al. | 485/454 |
| 5,799,061 | A | 8/1998 | Melcher et al. | 379/45 |
| 5,835,907 | A | 11/1998 | Newman | 707/10 |
| 5,963,861 | A * | 10/1999 | Hanson | 455/456.1 |
| 5,999,808 | A | 12/1999 | LaDue | 455/412.2 |
| 6,049,711 | A * | 4/2000 | Ben-Yehezkel et al. | 455/414.3 |
| 6,397,057 | B1 * | 5/2002 | Malackowski et al. | 455/414.1 |
| 6,519,463 | B1 * | 2/2003 | Tendler | 455/456.3 |

FOREIGN PATENT DOCUMENTS

| | | |
|---|---|---|
| GB | 2246910 | 2/1992 |
| WO | 93/16452 | 8/1993 |

* cited by examiner

LOCATION BASED SERVICE REQUEST SYSTEM

RELATED APPLICATIONS

This application is a continuation of U.S. patent application Ser. No. 08/608,482 filed Feb. 28, 1996 now U.S. Pat. No. 6,519,463 B2.

FIELD OF INVENTION

This invention relates to a system for providing assistance to wireless phone callers, and more particularly, to a wireless phone and GPS-based assistance system.

BACKGROUND OF THE INVENTION

As is now common, central dispatch offices are utilized in the provision of roadside assistance through the utilization of an 800 number. Upon dialing a predetermined 800 number from a wireless phone such as a cellular phone, the central dispatch office, through the utilization of its database, can direct the motorist to a variety of different services. For instance, the central dispatch service can provide information as to the nearest towing service, the nearest gas station, the nearest theatre, the nearest drug store, or, in fact, any service of interest to the motorist for which the dispatch office has information in its database.

Moreover, with databases utilized at the central dispatch office, it is possible to keep medical records of individuals owning the phone on file so that in the case of a vehicular accident, these files can be accessed and the appropriate information can be given to rescue authorities.

One of the major drawbacks with the respect to such a system is that there is currently no easily implemented way to provide information as to the whereabouts of a vehicle. While, GPS-based systems exist for in-car mapping and other position related applications, such a system is not readily available to every motorist without an extensive retrofit of the vehicle and corresponding cell sites, making such systems infrastructure intense. It is in fact a daunting task to be able to provide GPS-based services by providing a GPS receiver in every motor vehicle, much less on a cost effective basis. Thus, it is only with reluctance that automobile manufacturers are providing automobiles with GPS receivers and antennas.

SUMMARY OF INVENTION

In the subject system, the problem of providing a cost effective means of providing roadside or other services is implemented by informing central dispatch offices of the location of a vehicle through the utilization of a wireless phone having an associated GPS receiver, antenna, and voice synthesis capability for transmitting not only the identity of the vehicle, but also the location of the vehicle in English or other spoken language.

In one embodiment, the phone is located in a handsfree cradle having service-request buttons to cause the phone to dial the central dispatch office with a service request and location of the phone. Through a synthetic voice announcement, when the phone calls the central dispatch office, the verbally announced information is processed by an operator, at which point the latitude and longitude of a vehicle is recorded. The central dispatch office then correlates the position of the vehicle with the services requested, with a match being performed to provide the identity and/or address of the nearest local service provider either to the dispatch operator or to the operator of the motor vehicle.

Thus, when traveling in unfamiliar territory, one need only press a button on the handsfree cradle of the phone, at which point the central dispatch office is dialed, and after synthetic voice communication with the dispatch office to indicate the location of the vehicle, two way verbal communication may be established to permit the driver to ask for whatever service he or she wants. This can be taken care of by the dispatch office, or the caller can be directly linked or patched to the service provider. Alternatively, the handsfree cradle may be provided with a number of different service related buttons such as "Gas Station", "Pharmacy", "Food", etc. so that these service providers are directly dialed.

As will be appreciated, the subject system provides the central dispatch office not only with the location of the caller, but also the nature of the requested service. This being the case, should a motorist be in an unfamiliar city and seek a particular service, with the touch of a button, the wireless phone is made to dial the central dispatch office, which in turn can either route the call to the appropriate service provider, or provide information back to the motorist so that the motorist can be directed to the service provider and/or contact service provider himself.

In one embodiment, the wireless phone is available as a unitary device with service-request buttons thereon. Alternatively, when utilized in a vehicle, the phone may be placed in the aforementioned handsfree cradle that has one or more service-request buttons on the cradle.

Note that in one embodiment, the cradle is provided with a passive transfer antenna to couple the relatively weak GPS signals from an active GPS antenna mounted outside the car to the internally carried GPS antenna in the phone. The result is to be able to receive the relatively weak GPS signals within the body of the vehicle through the utilization of the transfer antenna, with the transfer antenna being mounted at the handsfree cradle adjacent the GPS antenna that is carried by the unitary phone.

The abovementioned handsfree cradle communicates the fact of a service-request button push to a printed circuit board within the phone, with the printed circuit board carrying a CPU, a speech synthesizer and a dialer. The board is connected to the phone bus which is also connected to the handsfree cradle such that when the phone is placed in the handsfree cradle, the service-request buttons cause the phone to dial the appropriate number with the appropriate message and position of the phone. As a result, with a single button push at the handsfree cradle, one or more services can be requested through the corresponding switch closure being transmitted to the CPU on the printed circuit board within the phone. When the switch closure is sensed, the phone is made to dial a predetermined number followed by transmission of the corresponding message.

It will be appreciated that any number of service-request buttons may be placed on the handsfree cradle such that the nearest gas station, the nearest pharmacy, or the nearest grocery store can be requested through the dialing of a separate number associated with each of the buttons. In another embodiment, a single "Concierge" button is provided to enable the central dispatch office to call the appropriate service provider directly, and as an added service, pass the call through to the service provider. As such a location-dependent concierge service is provided. In summary, either through a single Concierge button or with multiple specific service-request buttons, the motorist can be given the services that he or she desires due to the provision of the caller's location from a GPS receiver at the phone.

It will be appreciated that the service can be provided either by the central dispatch office which takes care of the individual needs of the motorist, or the motorist can merely be put in touch with the service provider through a direct link of the cell phone call to the service provider. What will be apparent is that regardless of the form the service takes, the transmission of latitude and longitude provides a unique way of selecting the closest service provider.

While the subject invention relates to wireless phones in general, for convenience, the remainder of the description of the invention will center on its use with cellular phones. It will be appreciated that utilizing an existing cellular telephone and an internally carried GPS engine also solves the problem of economically providing a GPS receiver within a vehicle, since the cost of the cellular phone along with the GPS receiver is bourn by the carrier and ultimately by the consumer on a monthly charge basis. The above enables a cost effective method of providing roadside assistance, while at the same time providing normal cellular communication through the utilization of a standard cellular phone modified with the GPS-based location system. The above also permits emergency signalling to public service access points or PSAP'S as to the location of an accident or other emergency.

As will be seen, in one embodiment a unitary cellular phone is provided with an internal GPS engine, an internal GPS antenna, and an internal printed circuit board having a speech synthesizer for providing a verbal rendition of the latitude and longitude of the cellular phone, along with a dialer which is coupled to the cell phone bus to control the functioning and the modulation of the cellular phone.

While the above has described a unitary cellular phone with a GPS receiver, a speech synthesizer, a CPU and a GPS antenna within the cellular phone, in an alternative embodiment, the GPS receiver, the location/speech circuit including speech synthesizer and CPU, and an external GPS antenna may be provided in the abovementioned handsfree cradle. In this embodiment, circuits within the cradle cause the phone to dial and provide modulation of the phone with a verbal message through the normal bus structure of the cellular phone. As a result, standard cellular phones can be modified through the utilization of such a handsfree cradle to provide the needed location function.

It will, therefore, be appreciated that the GPS receiver and the speech synthesizer and dialer board may be carried in the handsfree cradle rather than within the cellular phone. The information from the GPS unit is provided, in this instance, to the CPU that is coupled to the speech synthesizer which couples the speech synthesizer output to the microphone input to the cell phone bus. The dialer board causes the phone to dial the indicated number by appropriate signalling over the cell phone bus. In this manner, by providing a handsfree cradle with a GPS receiver and speech and dialer board, vehicles can be retrofitted readily and inexpensively to provide a location-dependent request for services.

Whether the cellular telephone is a unitary device or whether the GPS receiver and other circuitry are built into the handsfree cradle, a cost effective system is provided to enable dispatch offices to correlate the position of a vehicle with the service required.

While the above has been described in connection with vehicle related services, it will be appreciated that taking the cellular phone out of the car and providing it with a service-request button can provide the non-motorist with a means of obtaining services that the individual might want. For instance, when a pedestrian in an unfamiliar city is seeking the nearest drug store, a Concierge button on the unitary cellular phone can provide the central dispatch office with the same information as described above, regardless of whether or not the GPS-based cellular phone is within a vehicle.

It will also be appreciated, while the subject system has been described in connection with a synthetic voice annunciation of the position of the phone, digital systems involving digital signalling of the same information are within the scope of this invention.

In summary, a wireless phone based system is provided to accommodate users of phones for transmitting information as to the location of certain services such as gasoline stations, movie theatres, drug stores, etc., in which the phone includes a GPS receiver with the phone adapted to call a predetermined number requesting the desired service and providing the location of the phone. In one embodiment for vehicular applications, the GPS receiver is co-located with the phone, with the phone being carried in a handsfree cradle having a number of service-request buttons, such that depression of a service-request button activates the phone through its bus structure to call a predetermined number and provide the identity of the caller along with the caller's location. In a further embodiment, a single button is utilized to cause the phone to dial a concierge service, in which the concierge service has operators and a database, such that the operator direct the caller to whatever service the caller desires, having been apprised of the location of the phone, this to allow the operator key in the latitude and longitude of the phone and access the database of services both as to the type of service and as to the location of the closest service provider.

BRIEF DESCRIPTION OF THE DRAWINGS

These and other features of the subject invention will be better understood taken in conjunction with the Detailed Description in conjunction with the Drawings of which.

DETAILED DESCRIPTION

Figure 1:
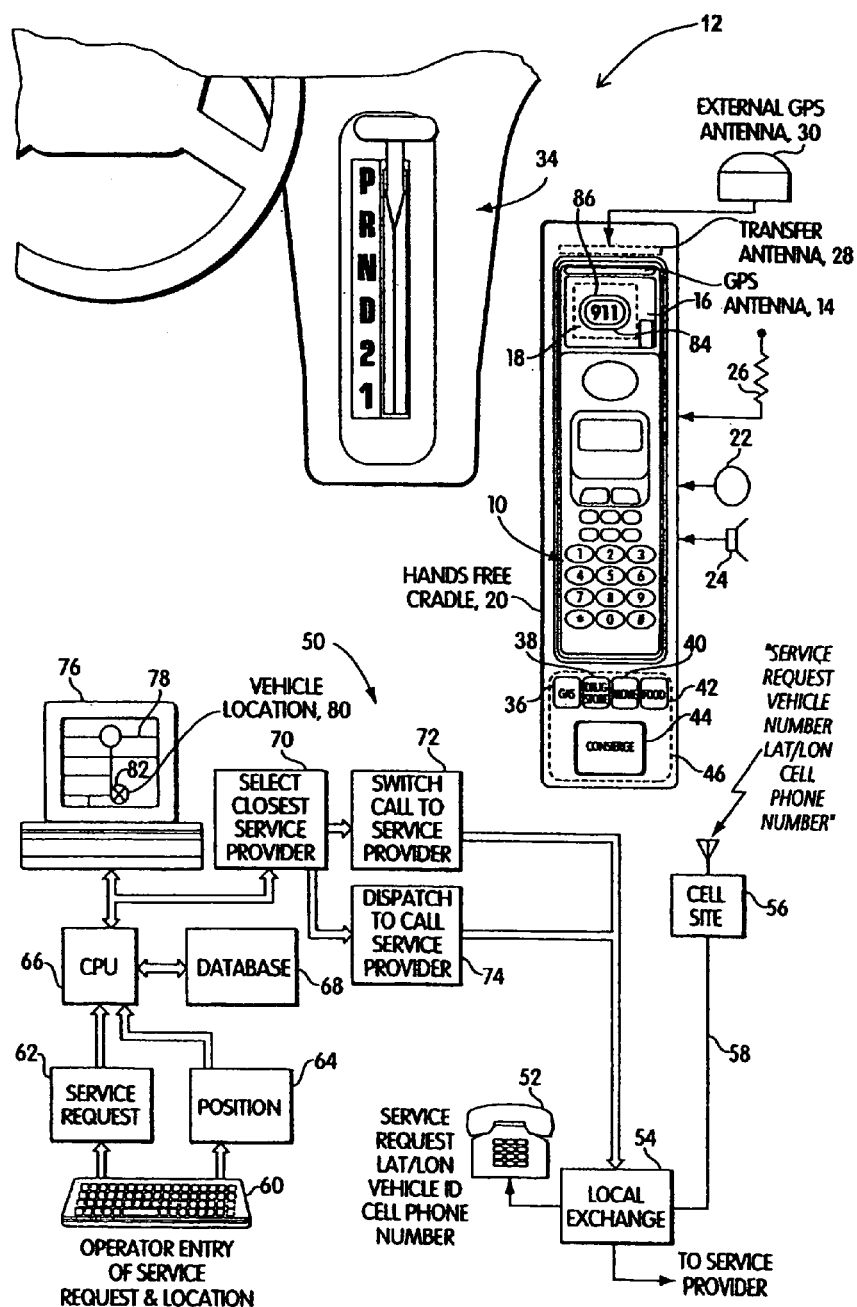
FIG. 1 is a diagrammatic and block diagram of the subject system illustrating the utilization of the cellular phone/GPS combination to transmit the location of the cellular phone to a central dispatch office for the provision of location-dependent services.
Figure 2:
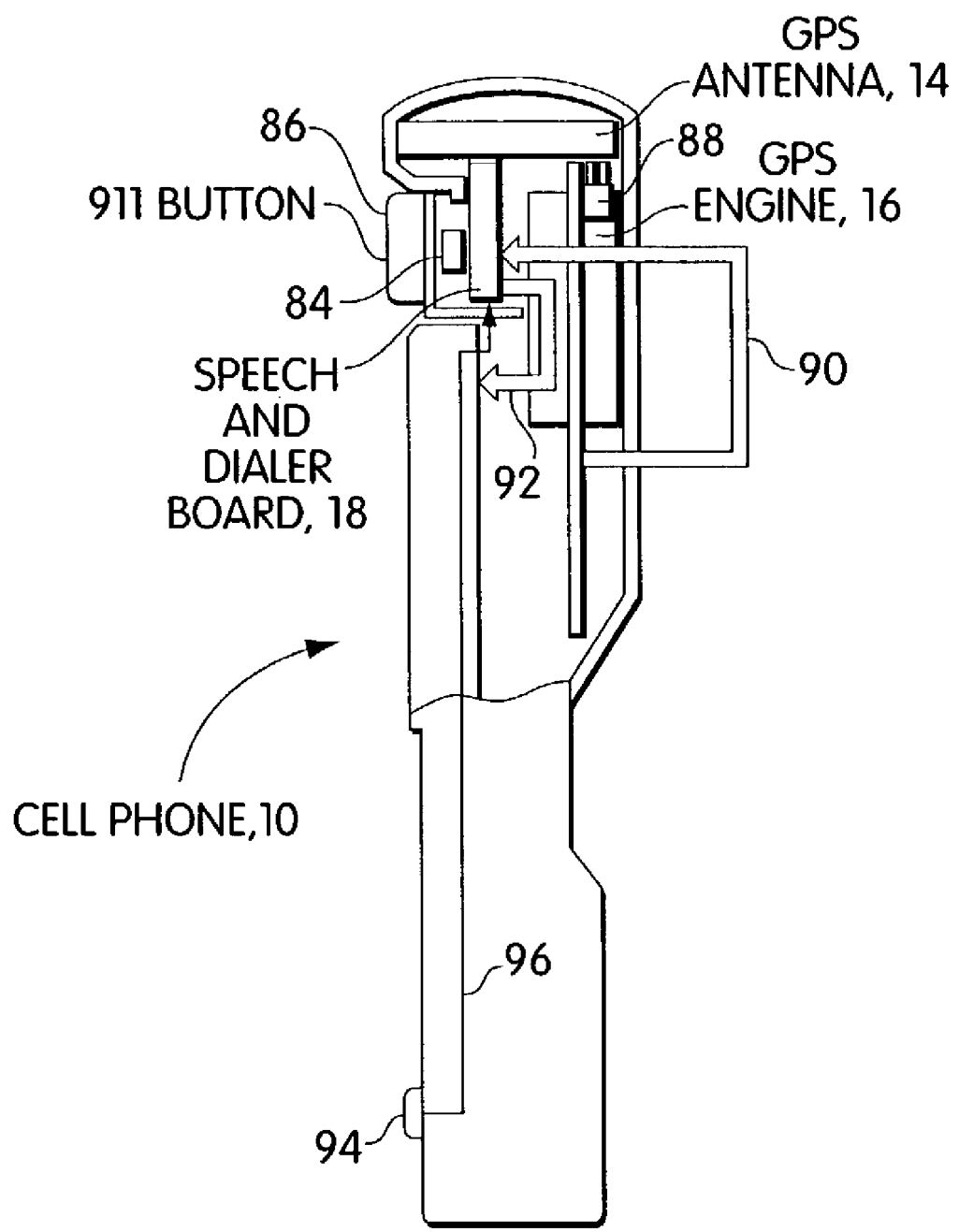
FIG. 2 is a diagrammatic illustration of a cellular phone housing a GPS receiver, GPS antenna, and speech and dialer board for the control and the modulation of the cellular phone as well as a service-request button coupled to the CPU/speech/dialer board for providing a unitary device.

Referring now to FIGS. 1 and 2, a cellular phone 10 within a vehicle 12 includes an internal GPS antenna 14 coupled to a GPS receiver 16, with the output of the GPS receiver coupled to a speech and dialer board 18 carried within the upper portion of cellular phone 10.

Figure 3:
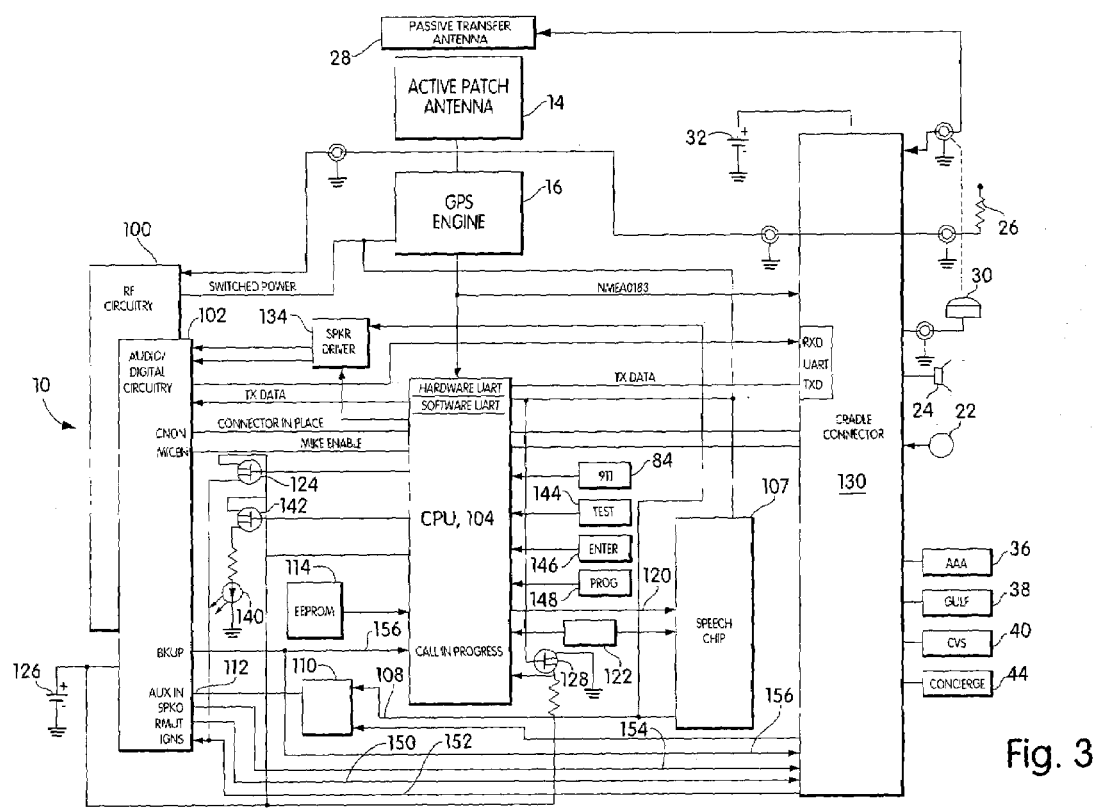
FIG. 3 is a block diagram of the speech and dialer board of FIG. 2 illustrating its connection to RF and audio circuitry within the cellular phone.

In the illustrated embodiment, cellular phone 10 is carried within a handsfree cradle 20 to which is attached the traditional handsfree microphone 22 and to which is coupled to an external speaker 24 as well as a vehicle mounted cellular phone antenna 26. Also carried within handsfree cradle 20, is a transfer antenna 28 in close proximity to GPS antenna 14, with transfer antenna 28 coupled to an external active GPS antenna 30 which is powered by the vehicle battery as shown at 32 (FIG. 3).

Handsfree cradle 20 is conveniently located adjacent vehicle console 34 and carries a number of service request buttons 36, 38, 40, and 42, corresponding respectively as illustrated to a request for gas station location, drug store location, movie theatre location, and food services location. Also located on handsfree cradle 20, is a CONCIERGE button 44, which is utilized to obtain concierge services from a central office dispatch center as will described.

Each of buttons 36–44 is utilized to cause cellular phone 10 to dial a predetermined number when the corresponding button is depressed. This is accomplished through the cellular phone bus, with buttons 36–44 coupled to an internally carried interface board 46 that, upon sensing a switch closure, provides a suitable signal to the bus between it and the cellular phone for causing the cellular phone to dial a predetermined number.

The result of the depression of any one of the service-request buttons is the activation of the cellular phone to dial the predetermined number and to transmit the requisite information either verbally or digitally that there is a service request, the vehicle number, the latitude and longitude of the cell phone as sensed by the GPS receiver, along with the cellular phone number for both billing and call-back purposes.

It will be appreciated that once having established contact with a central office dispatch center, not only is the particular service request known, but operators at the dispatch center can talk directly with the requesting individual.

In order for this to be accomplished, a dispatch center generally indicated by reference character 50 includes a telephone 52 coupled to a local exchange 54 which is in turn coupled to a cell site 56 by a land line 58, such that the location of the cell phone is made known to the central office dispatch center.

What is received at the central office dispatch center is a service request, the position of the cellular phone placing the service request, a vehicle identification number, if desired, and the cellular phone number of the cellular phone initiating the call.

While the following operation may be automatically implemented, the subject system will described in terms of the synthesized voice verbal annunciation of the service request, position, vehicle identification number and cell phone number, as reported to an operator at the central office dispatch center.

Upon receipt of a call, the operator types in the service request, the latitude and longitude, and, optionally, the vehicle identification number and cell phone number at a keypad 60 which encodes the service request at 62 and the position at 64, the indicated data being coupled to a CPU 66 which accesses a database 68. The database has incorporated therein the location of the particular service provider, the services rendered by the service provider, and, optionally, the availability of the service provider, the rates for the service, and any other information useful in the provision of the service.

Since database 68 contains the location of the service provider, this is correlated with the position of the cellular phone as generated at 64, with a unit 70 selecting the closest service provider for the particular service requested. The option then is to switch the call from the cellular phone directly to the service provider via switch 72 so that the caller of the services may be directly patched to the service provider. Alternatively, the central office dispatch center may be interfaced with the service provider directly such that the dispatch center places a call at 74 to the particular service provider.

In any event, the closest service provider is identified and is contacted either by the caller or the dispatch center so that the requisite services can be rendered. Because the cellular phone number or the vehicle identification number or both are provided to the central dispatch office, charges for the cellular based service request may be invoiced to the caller.

For convenience, a monitor 76 may be provided with maps 78 on which the location of the caller, in this case vehicle location 80, is depicted by a cursor 82. In this manner, the operator at the central office dispatch center can track the progress of the vehicle and can verbally communicate with the service provider as to the location of the caller.

It is also possible that database 68 have incorporated therein medical information of the owner of the cellular phone that emergency services can be dispatched from the central dispatch office. For this purpose, an emergency button 84 is provided under a protective cover 86 which when pushed can either be made to dial 911 directly, or can be made to dial the dispatch center. The information transmitted from the cellular phone to the central office dispatch center, would thus, be a "MAYDAY" request followed by latitude and longitude to enable the central dispatch office to call the appropriate authorities.

Referring now to FIG. 2, cell phone 10 is shown as incorporating GPS receiver or engine 16, with speech and dialer board 18 being located ahead of the GPS engine. As can be seen, emergency button 84 is mounted to the speech and dialer board, with cover 86 being in place over emergency button 84 to prevent accidental actuation. As pictured, GPS antenna 14 is coupled to GPS engine 16 via connector 88, with location information coming from GPS engine 16 to speech and dialer board 18 via the NEMA 0183 bus 90. Also as depicted, a bus 92 runs between speech and dialer board 18 to cellular phone 10 for the control thereof and the modulation and the modulation section thereof.

If the system is to be provided as a unitary device, phone 10 is provided with one or more service-request buttons 94 coupled to speech and dialer board 18 via line 96. This avoids having to provide a handsfree cradle and makes the service-request system completely portable.

Referring now to FIG. 3, cellular phone 10, in general, has RF circuitry 100 and audio/digital circuitry 102 for the provision of cellular phone calls. Speech and dialer board 18 includes CPU 104 which includes a hardware UART and a software UART, with CPU 104 being coupled to a speech synthesizer 107 for the purpose of providing the requisite service-request message via an audio line 108 through an audio mixer 110 to an audio in terminal 112 of the audio/digital circuitry. An $E^2ROM$ 114 is utilized to store the preprogrammed telephone numbers and other data that is used by CPU 104 to control the operation of cell phone 10 through its audio/digital circuitry 102. For this purpose, a TX data line is provided to control the dialer section and all phone related functions for cellular phone 10.

It will be appreciated that CPU 104 provides control of speech synthesizer 107 via control lines 120, with a crystal 122 providing the speech clock.

Automatic turn-on of the cellular phone upon depression of a service-request button, is accomplished through a power enable transistor circuit 124 which is utilized to turn on the cellular phone, with the power being derived from phone battery 126 as illustrated. Note that the turning off of switched power by virtue of the turn off of the cellular phone is sensed by transistor circuitry generally illustrated at 128 so that CPU 104 can be placed in its low power drain mode.

As illustrated, handsfree cradle 20 has a cradle connector 130 to which service request buttons 36, 38, 40 and 44 may be connected. These service requests are coupled to CPU 104 via software UART over TX data line so as to cause CPU 104 to initiate the appropriate service requests and to cause cell phone 10 to dial the appropriate number.

In the programming of E-PROM 114, an audio output of speech synthesizer 107 is utilized to drive an internal speaker of cell phone 10, not shown, via speaker driver 134 controlled by CPU 104 via volume control.

Also provided as inputs to CPU 104 is the aforementioned emergency button switch 84, a test button switch 144, an enter button switch 146, and a program switch 148 for the testing of the system and for the entering of predetermined numbers into $E^2ROM$ 114.

Also provided at the cell phone is an LED indicator 140 driven by transistor circuit 142 to indicate at the cell phone that a GPS fix has been achieved.

A receiver mute line 150 is provided from cradle 130 for muting car-mounted broadcast receivers, and an ignition sense line 152 is provided for informing the cellular phone that the handsfree cradle has been connected. A speaker out line 154 is provided from the cellular phone to the handsfree cradle for driving speaker 24 and a backup switch protection line 156 is provided for both informing CPU 104 that there is a call in progress and to provide this information to the handsfree cradle.

The call-in-progress line 156, called the "back-up switch line", is utilized by CPU 104 to request further services, in the form of a 911 back-up call when after the 911 button has been pushed, the call has been terminated to the PSAP. The falling of the call-in-progress flag causes CPU 104 to have cell phone 10 dial a central office dispatch number with a specialized type of emergency service request. In one embodiment, the service request is to have the operators at the dispatch center first call the cellular phone to see if emergency services have been dispatched, and then to call the particular PSAP involved to assure that services have been rendered.

It will be appreciated that the system described in connection with FIG. 3 incorporates all of the functions on an internally carried speech and dialer board 18 carried within cell phone 10. However, as mentioned above, the entire function of the CPU, and in fact, the GPS receiver and active patch antenna can be carried within handsfree cradle 20 so that all that is necessary to initiate the call is controlling the normal cellular phone bus from the handsfree cradle.

However, providing all functions in the unitary phone results in the ability to request services from a unitary device without having to provide a handsfree cradle. As such, the subject system incorporates the concept of providing services regardless of whether or not the cellular phone is in a vehicle.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. In a wireless phone based system involving a wireless network, a system for delivery of a requested location-based service designed to be charged to the wireless phone user, comprising:

a wireless device operated by a user on said wireless network, said wireless device having a number associated therewith, a unit for receiving geopositioning signals from at least one remote location and a transmitter responsive to received geopositioning signals for transmitting via said wireless network a signal useful in determining a geophysical location of said wireless device and said number to a predetermined location; and an entity at said predetermined location for arranging for delivery of said location-based service responsive to said transmitted signal and for arranging charging of said user for the requested location-based service based on said number.

2. The system of claim 1, wherein said number is a mobile identification number.

3. The system of claim 1, wherein said location-based service includes an indication to a third party of the location of said wireless device.

4. The system of claim 3, wherein said third party is the party providing the location-based service.

5. The system of claim 1, wherein said location-based service includes road side assistance.

6. The system of claim 1, wherein said location-based service includes indicating to an individual using said wireless device, the location of the wireless device.

7. The system of claim 6, wherein the location of said wireless device is transmitted to said wireless device.

8. The system of claim 1, wherein said location-based service includes the location of a location-based service.

9. The system of claim 8, wherein the location-based service is provided by a location-based service provider closest to the location of said wireless device.

10. The system of claim 9, wherein the closest location-based service provider is geographically closest.

11. The system of claim 9, wherein the closest location-based service provider is closest in terms of transit time from the location of said wireless device to the location of the location-based service provider.

12. The system of claim 1, wherein said location-based service is an emergency service.

13. The system of claim 1, wherein said location-based service is a concierge service.

14. In a wireless phone based system involving a wireless network for which a carrier charges a user, a method for providing a requested location-based service to a user of a wireless device, comprising the steps of:

ascertaining the location of the wireless device and a number associated with the wireless device;

providing a location-based service based on the ascertained location; and, arranging payment from the user of the wireless device for the requested location-based service, and based on the number associated with the wireless device.

15. The method of claim 14, wherein the location-based service is an emergency service.

16. The method of claim 14, wherein the location-based service is a concierge service.

17. The method of claim 16, wherein the concierge service alerts the user of the wireless device to the location of a service provider.

18. The method of claim 14, wherein the location-based service includes providing information to the user of the wireless device.

* * * * *